United States Patent
Matei et al.

(10) Patent No.: US 8,224,097 B2
(45) Date of Patent: Jul. 17, 2012

(54) BUILDING SEGMENTATION FOR DENSELY BUILT URBAN REGIONS USING AERIAL LIDAR DATA

(75) Inventors: Bogdan Calin Mihai Matei, Monmouth Junction, NJ (US); Supun Samarasekera, Princeton, NJ (US); Janet Yonga Kim, Morrisville, PA (US); Charles Fielding Finch Karney, Princeton, NJ (US); Harpreet Singh Sawhney, West Windsor, NJ (US); Rakesh Kumar, West Windsor, NJ (US)

(73) Assignee: SRI International, Menlo Park, CA (US)

( * ) Notice: Subject to any disclaimer, the term of this patent is extended or adjusted under 35 U.S.C. 154(b) by 1070 days.

(21) Appl. No.: 12/138,027

(22) Filed: Jun. 12, 2008

(65) Prior Publication Data
US 2009/0310867 A1    Dec. 17, 2009

(51) Int. Cl.
    *G06K 9/46*    (2006.01)
    *G06K 9/34*    (2006.01)
(52) U.S. Cl. .......................... 382/204; 382/180
(58) Field of Classification Search .................. None
    See application file for complete search history.

(56) References Cited

U.S. PATENT DOCUMENTS

| | | | | |
|---|---|---|---|---|
| 2003/0218617 A1* | 11/2003 | Ohto | .............................. | 345/619 |
| 2004/0041805 A1* | 3/2004 | Hayano et al. | ................. | 345/419 |
| 2006/0061566 A1* | 3/2006 | Verma et al. | .................... | 345/419 |
| 2009/0232388 A1* | 9/2009 | Minear et al. | ................. | 382/154 |

OTHER PUBLICATIONS

Sharon, D. Loopy belief propagation in image-based rendering. Tech. rep., Department of Computer Science, University of British Columbia, 2004.*
Verma et al, "3D Building Detection and Modeling from Aerial LIDAR Data," Proceedings of the 2006 IEEE Computer Society Conference on Computer Vision and Pattern Recognition (CVPR'06).*
Sohn, G., Dowman, I.J., 2001. Extraction of buildings from high resolution satellite data. In: Baltsavias, E.P., Gruen, A., Van Gool, L. (Eds.), Automatic Extraction of Man-Made Objects from Aerial and Space Images (III). Zurich.*
Thrun et al, "A Real-Time Expectation-Maximization Algorithm for Acquiring Multiplanar Maps of Indoor Environments with Mobile Robots." IEEE Transactions on Robotics and Automation, vol. 20, No. 3, Jun. 2004.*

(Continued)

*Primary Examiner* — Jason M Repko
*Assistant Examiner* — David F Dunphy
(74) *Attorney, Agent, or Firm* — Moser Taboada

(57) ABSTRACT

A method for extracting a 3D terrain model for identifying at least buildings and terrain from LIDAR data is disclosed, comprising the steps of generating a point cloud representing terrain and buildings mapped by LIDAR; classifying points in the point cloud, the point cloud having ground and non-ground points, the non-ground points representing buildings and clutter; segmenting the non-ground points into buildings and clutter; and calculating a fit between at least one building segment and at least one rectilinear structure, wherein the fit yields the rectilinear structure with the fewest number of vertices. The step of calculating further comprises the steps of (a) calculating a fit of a rectilinear structure to the at least one building segment, wherein each of the vertices has an angle that is a multiple of 90 degrees; (b) counting the number of vertices; (c) rotating the at least one building segment about an axis by a predetermined increment; and (d) repeating steps (a)-(c) until a rectilinear structure with the least number of vertices is found.

25 Claims, 8 Drawing Sheets

OTHER PUBLICATIONS

F. Bernardini, J. Mittleman, H. Rushmeier, C. Silva, and G. Taubin, "The Ball-Pivoting Algorithm for Surface Reconstruction," IEEE Transactions on Visualization and Computer Graphics, 5(4):349-359 (1999).

C. Bishop, "Pattern Recognition and Machine Learning," Springer, pp. 411-415 (2006).

Y. Guo, H. Sawhney, R. Kumar, and S. Hsu, "Learning-Based Building Online Detection From Multiple Aerial Images," in ECCV, pp. 545-552 (2001).

K. Kraus and N. Pfeifer, "Determination of Terrain Models in Wooded Areas With Airborne Laser Scanner Data," ISPRS Journal of Photogrammetry and Remote Sensing, 53(4):193-203 (1998).

F. Rottensteiner, J. Trinder, S. Clode, and K. Kubik, "Automated Delineation of Roof Planes From LiDAR Data," in Laser05, pp. 221-226 (2005).

J. Sun, H.-Y. Shum, and N.-N. Zheng, "Stereo Matching Using Belief Propagation," PAMI, 19:787-800 (2003).

P. Torr and A. Zisermann, "MLESAC: A New Robust Estimator With Application to Estimating Image Geometry," CVIU, 78:138-156 (2000).

V. Verma, R. Kumar, and S. Hsu, "3D Building Detection and Modeling from Aerial LIDAR Datam," in CVPR (2006).

* cited by examiner

Chain Code

BUILDING SEGMENTATION FOR DENSELY BUILT URBAN REGIONS USING AERIAL LIDAR DATA

FIELD OF THE INVENTION

The present invention relates generally to computer vision, and more particularly, to a method for automatically extracting 3D models of dense urban regions using aerial LIDAR data.

BACKGROUND OF THE INVENTION

Building modeling has numerous applications in a wide variety of tasks such as urban planning, cartography, 3D visualization for virtual city tours and autonomous robot navigation. In many practical situations, it is desired to obtain 3D models for areas of hundreds and thousands of square kilometers within days and with minimal manual interaction. Traditionally, building modeling has employed data collected either from the ground or from the air. Ground-based data provides high details on facades of buildings, but lacks information on tops of buildings. Aerial data can yield very accurate building footprints and can facilitate the fusion of multiple images through ortho-rectification to cover large geographical areas, but aerial data generally lacks information on the sides of buildings necessary for producing a 3D model.

Most of the research on building modeling has employed 2D imagery, which is very inexpensive to acquire, but poses inherent difficulties for automatic 3D modeling due to known limitations of stereo algorithms for recovering 3D structure from multiple views, especially in untextured areas and at depth discontinuities. Because of these limitations, most image-based modeling systems in the prior art are either manual or semi-automatic and required a large amount of computer time to produce 3D models.

Light Detection and Ranging (LIDAR) has emerged in recent years as a viable and cost-effective alternative to using solely 2D imagery, because LIDAR can directly produce precise and accurate range information and can significantly alleviate the task of automatic building segmentation. Aerial LIDAR collections can acquire data over entire cities very rapidly, however due to constraints imposed by the operating conditions on the altitude and speed of an airborne platform, the resolution of the data is typically less than one point per square meter. LIDAR measurements from multiple views are typically co-registered together in the same global coordinate system by tracking the pose of the LIDAR sensor as it acquires data, using GPS and inertial measurement units (IMU). In several LIDAR based building segmentation algorithms, 3D points are classified in three classes: terrain, clutter and building. First, the 3D measurements are classified as ground and non-ground, and subsequently the non-ground points are divided into clutter and building regions.

In K. Kraus and N. Pfeifer, "Determination of terrain models in wooded areas with airborne laser scanner data,"*ISPRS Journal of Photogrammetry and Remote Sensing*, 53(4):193-203, 1998, an iterative method is presented for terrain modeling based on removing at each step 3D measurements with residuals to the current terrain surface larger than a threshold and re-estimating the terrain surface using the remaining data. Because the initialization of the terrain used all the data, the method may not converge for densely built regions. Morphological opening operators can be used to create a digital terrain model (DTM) which is subtracted from input data. DTM filters, inspired from image processing, may fail to produce good ground segmentation, especially for nonflat terrain. In V. Verma, R. Kumar, and S. Hsu, "3D building detection and modeling from aerial LIDAR datam," in *CVPR*, 2006, the ground and the buildings are segmented in one step by computing local planar patches (surfels) using Total Least Squares (TLS) and connecting the consistent neighboring surfels into regions using bottom-up region growing. The largest region is selected as ground, while the rest of the regions are classified as individual buildings. In F. Rottensteiner, J. Trinder, S. Clode, and K. Kubik, "Automated delineation of roof planes from LiDAR data," in *Laser05*, pages 221-226, 2005, a method is presented for the automatic delineation of roof planes using local plane estimation and grouping the local planes into larger regions starting from local seed locations. Over-segmented regions are merged together using co-planarity constraints. Points that do not belong to any surface are labeled as clutter. In J. Sun, H.-Y. Shum, and N.-N. Zheng, "Stereo matching using belief propagation," *PAMI*, 19:787-800, 2003 a max-product belief propagation (BP) algorithm is used for stereo matching to enforce constraints that neighboring pixels with the same intensity values are assigned the same depth. In Y. Guo, H. Sawhney, R. Kumar, and S. Hsu, "Learning-based building online detection from multiple aerial images," in *ECCV*, pages 545-552, 2001, a rectilinear approximation to outlines of buildings in an image based building detection system is employed. The orientation of each rectilinear fit is determined by finding the maximum in a histogram of local image gradients approximating tangent directions to the contour. This method assumes that errors of the contour points are relatively small.

Automating building segmentation is a critical component in any 3D modeling system by providing 3D regions (segments) with little or no manual interaction. Each of the aforementioned methods employ automatic building segmentation algorithms which fall short in efficiency or resolution. More particularly, the above-cited references assume that the ground (as opposed to buildings) covers the largest surface area, and are therefore innapropriate for use in modelling dense urban areas. Accordingly, what would be desirable, but has not yet been provided, is an efficient, accurate method for automatic building segmentation for automatically extracting 3D models of dense urban regions using aerial LIDAR data.

SUMMARY OF THE INVENTION

The above-described problems are addressed and a technical solution achieved in the art by providing a method for extracting a 3D terrain model for identifying at least buildings and terrain from LIDAR data, comprising the steps of generating a point cloud representing terrain and buildings mapped by LIDAR; classifying points in the point cloud, the point cloud having ground and non-ground points, the non-ground points representing buildings and clutter; segmenting the non-ground points into buildings and clutter; and calculating a fit between at least one building segment and at least one rectilinear structure, wherein the fit yields the rectilinear structure with the fewest number of vertices. The step of calculating further comprises the steps of (a) calculating a fit of a rectilinear structure to the at least one building segment, wherein each of the vertices has an angle that is a multiple of 90 degrees; (b) counting the number of vertices; (c) rotating the at least one building segment about an axis by a predetermined increment; and (d) repeating steps (a)-(c) until a rectilinear structure with the least number of vertices is found. The method can further comprise the step of rendering the orientations of building segments to be consistent with neighboring buildings and, before the step of calculating, extracting contours for each of the building segments. A contour can be extracted using a ball pivoting algorithm.

Segmenting the non-ground points into buildings and clutter can further comprise estimating local surfels of the non-ground points at an adaptive scale; grouping non-ground surfels into coarse regions using a bottom up region growing technique; estimating planes for each course region; refining the location of the planes by fitting points to the planes by employing an expectation maximization technique; and segmenting building regions from the planes so as to enforce neighborhood constraints between planes and ensure sharp boundaries between regions by employing a loopy belief propagation (BP) framework. Voxels that are not grouped into any of the planes are removed as clutter. Estimating local surfels can further comprise computing the local covariance at multiple scales at each voxel which contains 3D data. Grouping non-ground surfels into coarse regions can further comprises the steps of determining a histogram of local normal orientation and computing a measurement of local planarity by integrating normal direction cues over a large area; and starting region growing from voxels which have a higher degree of local planarity, wherein a voxel is joined into a proposed region if local planar regions are coherent. Estimating planes for each course region can further comprise enforcing a constraint that joined surfels are either planar or quadric surfaces, so that the planar surfaces are fit to the course regions. The expectation maximization technique includes iteratively fitting points to planes and declaring points not fitting on any planes as outliers until there is no more changes to the assigned points on planes or outliers.

Classifying points in the point cloud as ground and non-ground points can further comprise performing an initial filtering out of points in the point cloud wherein high points are removed, the remaining points being putative ground points, the high points being those points that are higher than a maximum predetermined threshold; estimating surfels for each of the putative ground points; grouping ground surfals into planar regions using bottom-up region growing; constructing a hole-free terrain; and classifying points as ground and non-ground, wherein non-ground points are those which are higher than a predetermined threshold above the terrain. Bottom-up region growing comprises finding those neighboring surfels whose normals are the same and whose origins are consistent such that it can be concluded that the neighboring surfels belong to the same plane, and repeating said step of finding wherein until sharp edges are reached.

BRIEF DESCRIPTION OF THE DRAWINGS

The present invention will be more readily understood from the detailed description of an exemplary embodiment presented below considered in conjunction with the attached drawings and in which like reference numerals refer to similar elements and in which.

It is to be understood that the attached drawings are for purposes of illustrating the concepts of the invention and may not be to scale.

DETAILED DESCRIPTION OF THE INVENTION

Figure 1:
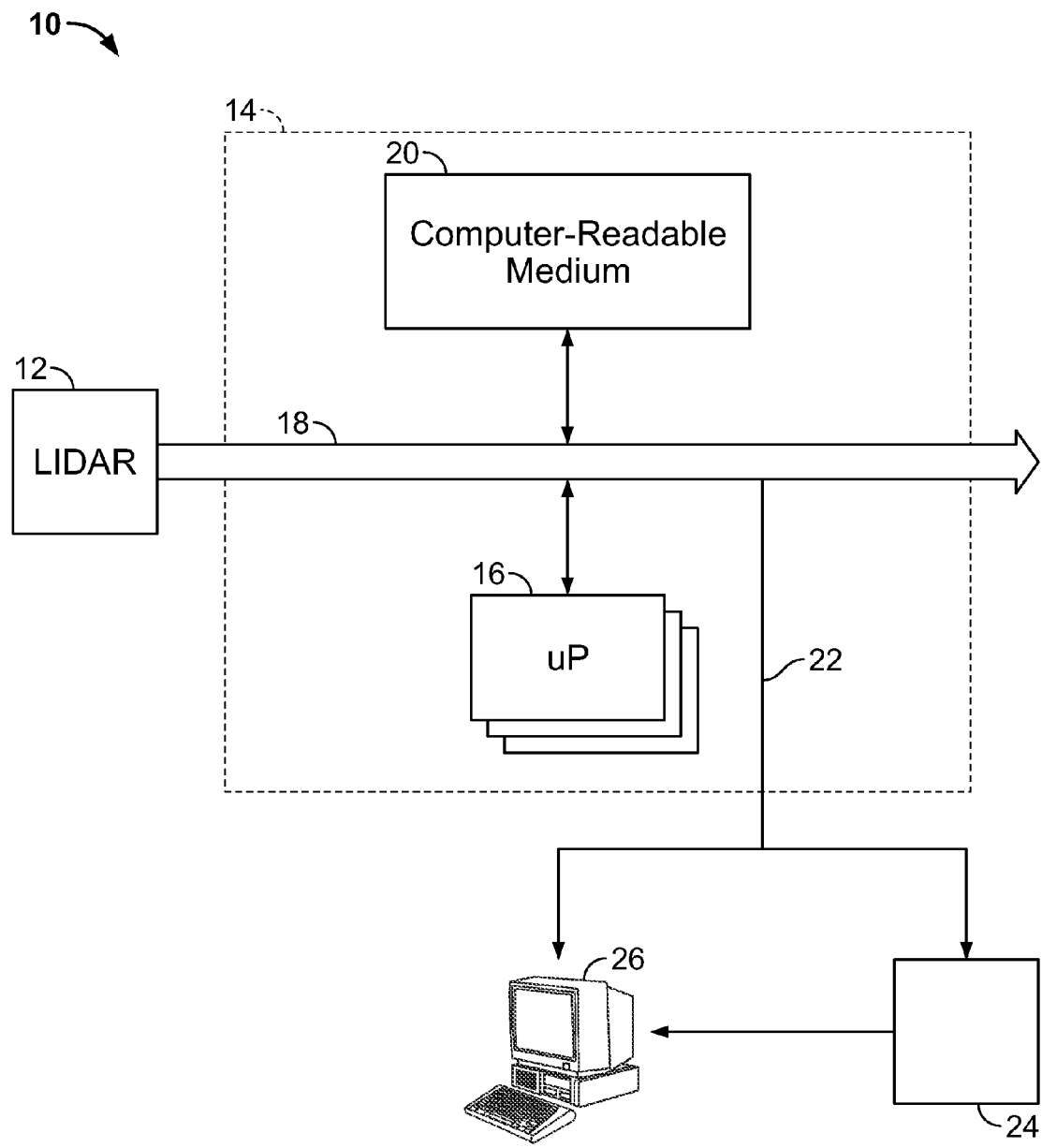
FIG. 1 is a block diagram of a hardware architecture of a system for automatically extracting a 3D terrain model for identifying at least buildings from LIDAR data, constructed in accordance with an embodiment of the present invention.

Referring now to FIG. 1, a system for automatically extracting 3D models of dense urban regions using aerial LIDAR data is shown, generally indicated at 10. By way of a non-limiting example, the system 10 receives aerial LIDAR data from a LIDAR system 12. The system 10 can include a computing platform 14. The computing platform 14 may include a personal computer or work-station (e.g., a Pentium-M 1.8 GHz PC-104 or higher) comprising one or more single or multi-core processors 16 which includes a bus system 18 which connects the one or more processors 16 with the computer-readable medium 20. The computer readable medium 20 can also be used for storing the instructions of the system 10 to be executed by the one or more processors 16, including an operating system, such as the Windows or the Linux operating system. The one or more processors 16 generate one or more 3D terrain maps from the computer-readable medium 20, thereby functioning as a 3D map generator. The computer readable medium 20 can include a combination of volatile memory, such as RAM memory, and non-volatile memory, such as flash memory, optical disk(s), and/or hard disk(s). A processed 3D map data stream 22 can be stored in the computer readable medium 20 for later output or fed in real time locally or remotely via an optional transmitter 24 to a monitor 26. The monitor 26 can display processed 3D map data stream 22 showing a 3D terrain map. In other embodiments of the system 10, the one or more processors 16 can be replaced by a digital signal processor, a field programmable gate array, or an application-specific integrated circuit.

Figure 2:
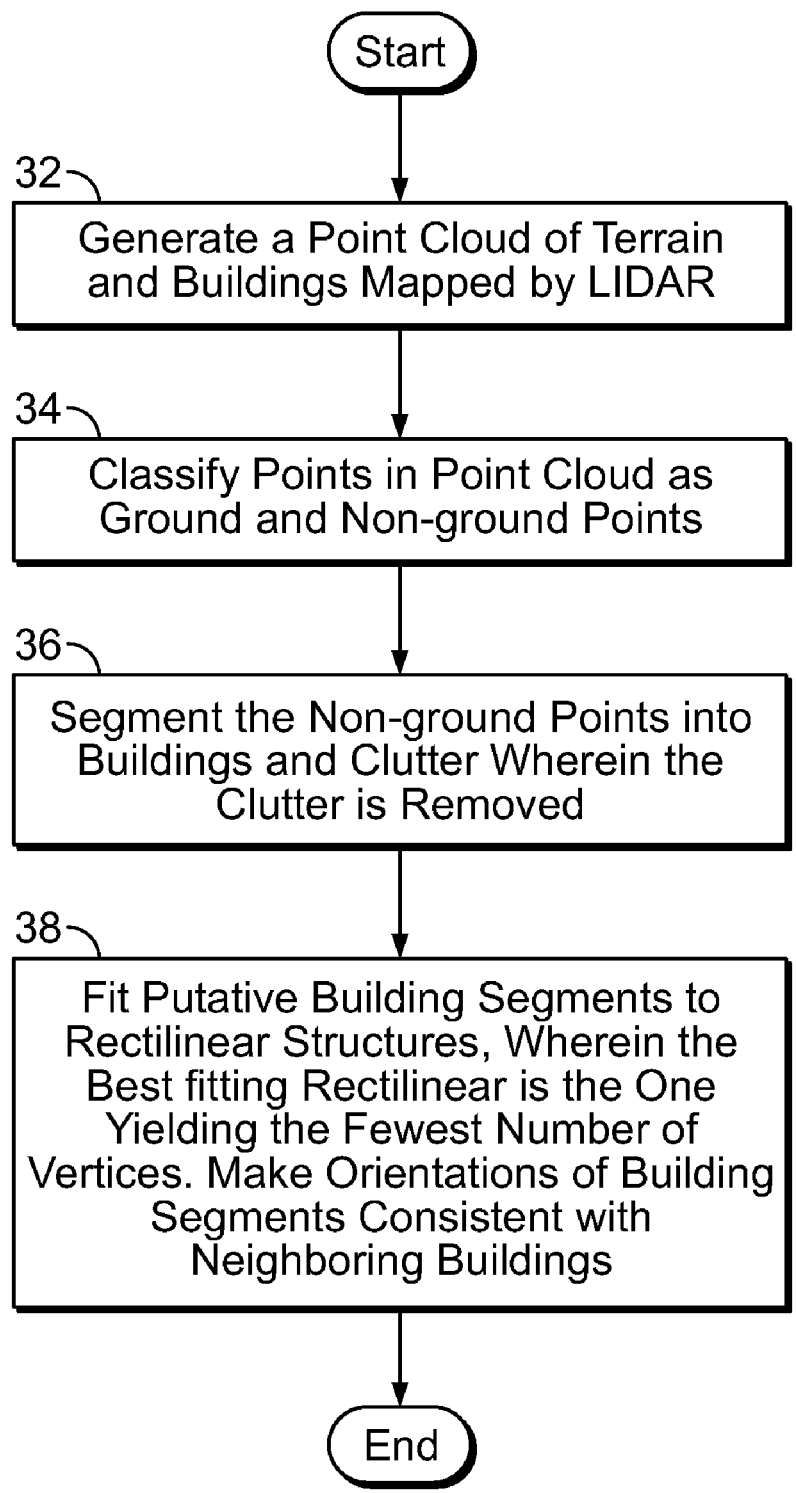
FIG. 2 is a flow chart of a method for automatically extracting a 3D terrain model for identifying at least buildings from LIDAR data associated with the system of FIG. 1.

Referring now to FIG. 2, a general outline of a method for automatically extracting 3D models of dense urban regions using aerial LIDAR data is depicted, constructed in accordance with an embodiment of the present invention. At step 32, an initial point cloud is generated of terrain and buildings mapped by LIDAR. At step 34, each of the LIDAR data points in the point cloud is classified as ground and non-ground points. At step 36, the non-ground points are segmented into buildings and clutter wherein the clutter, such as trees, is removed. At step 38, each of the putative building segments are fit to 3D polyhedral objects by means of finding the orientation of the building segments and these orientations are made consistent with neighboring buildings. The 3D polyhedral objects are rectilinear structures wherein an angle between any two consecutive edges is equal to a multiple of 90°. A rectilinear structure is formed at a plurality of orientation angles from 0 to 360 degrees and the structure yielding the least number of vertices is chosen as the best fit.

Figure 3:
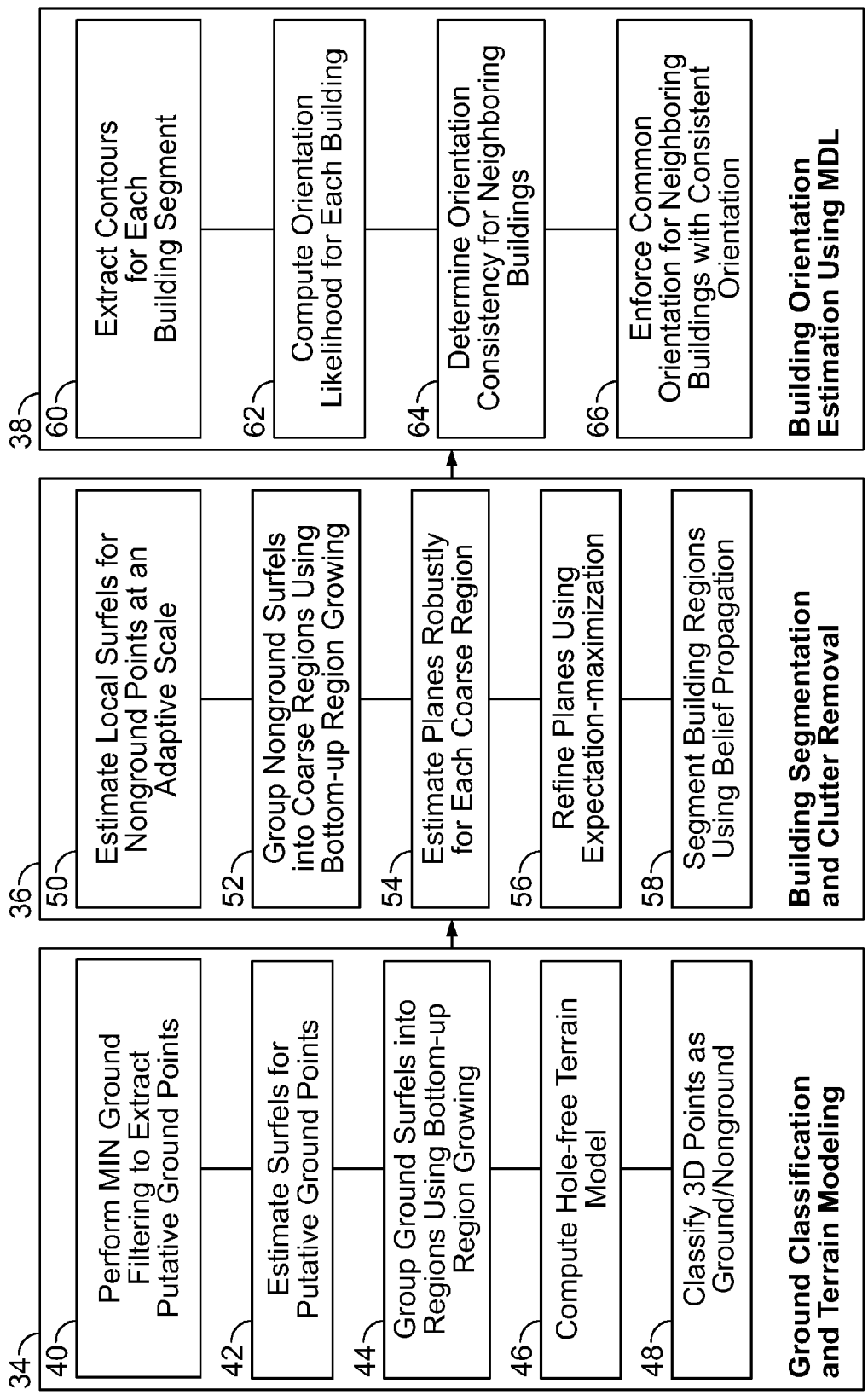
FIG. 3 is a more detailed flow chart of the method of FIG. 2.

Referring now to FIG. 3, a more detailed description of the method of FIG. 2 is presented. The method of FIG. 3 is divided into three major tasks, namely ground classification and terrain modeling, which performs the ground and non-ground classification step 34 of FIG. 2; building segmentation and clutter removal, which performs step 36 of FIG. 2, and building orientation estimation, which performs step 38 of FIG. 2. At step 40, an initial rough filtering out of points in a point cloud from LIDAR data that cannot be part of the ground is performed wherein "high" points are removed, the remaining points being putative ground points. The decision as to whether points are not considered ground points is based on a predetermined minimum height based on a computed slope of the terrain within an arbitrary area defined by an arbitrary location and a radius from that location. Points higher than a maximum threshold based on the slope of the "ground" within the circle defined by the radius are removed as non-ground. At step 42, surfels are estimated for each of the putative ground points found in step 40. Surfel is an abbreviation of "surface element" (an alternative to polygonal modeling). An object is represented by a dense set of points representing a local plane which is defined by an origin and a normal to that plane. The surfels are overlayed with voxels (volume element: tie 3D equivalent of a 2D pixel) of about 1 meter$^3$ in order to extract each of the local surface normals defined by the surfels. At step 44, ground surfals are grouped into planar regions using bottom-up region growing. Region growing involves finding those neighboring surfels whose normals are the same and whose origins are consistent such that it can be concluded that the neighboring surfels belong to the same plane. This process is recursively repeated until a sharp edge, such as a border of a building, is reached. At step 46, a hole-free terrain model is computed. Holes in the model created by buildings that may have been removed in step 40 are "filled" with points using interpolation. At step 48, 3D points are classified as ground or non-ground points. Points which are found to be higher than a predetermined threshold above the terrain in the terrain model completed in step 46 are regarded as non-ground. It is these points that are retained in subsequent steps of building segmentation and clutter removal performed in step 36 to be discussed hereinbelow.

A specific rigorous implementation of steps 40-48 for classifying points of a LIDAR 3D point cloud as ground G and non-ground N is described hereinafter. Let $x_m$, $x_M$, $y_m$, $y_M$, $z_m$ and $z_M$ be the minimum and maximum bounds of the 3D points along the X, Y, Z axes. Denote by $(i,j,k)=Y(p,v_g)$ the voxelization transformation which maps a 3D point p into a voxel of a 3D grid, with $v_g$ being the length of the voxel side.

LIDAR sensors do not penetrate solid surfaces, hence ground points must have a minimum height in the vicinity of buildings. This constraint is employed to remove 3D measurements that cannot be part of the ground. An image $A \in R^{N_x \times N_y}$ is calculated containing at each pixel the minimum z value of all the points that project into it, where $N_x = \lceil (x_M - x_m)/v_g \rceil$, $N_y = \lceil (y_M - y_m)/v_g \rceil$ and $\lceil x \rceil$ is ceiling function representing the smallest integer larger than x. A 2D minimum filter is applied with radius $\lceil L_{max}/v_g \rceil$ over A to produce an image B containing at a pixel $B_{i,j}$ the ground minimum within a local neighborhood. The constant $L_{max}$ is chosen function of the largest distance between the projections onto the XY plane of any point $p_a \in N$ and its closest ground point $p_b \in G$ (the Hausdorff distance). An upper bound on the height difference between $p_a$ and $p_b$ is $H_{max} = L_{max} |\tan(\phi_{max})|$ where $\phi_{max}$ is the maximum slope of the ground and we have used the monotonicity of the tan( ) function.

Denote by $\Gamma$ the set of voxels containing at least one point $p_u$ obeying $p_u^z \leq B_{i,j} + H_{max} + 6\sigma_v$, $(i,j,\cdot) = Y(p_u, v_g)$, where $\sigma_v$ is the standard deviation of the noise, assumed known from the operating conditions. $\sigma_v = 0.15$ m is employed. At each voxel $(i,j,k) \in \Gamma$, a local planar model is fit at several scales $\rho_1 < \ldots < \rho_s$ using the Total Least Squares (TLS) algorithm. For each scale $\rho_s$ the centroid is computed $c(\rho_s)$ and the normalized scatter matrix $C(\rho_s)$, of the points within radius $\rho_s$ from the voxel center $q_{i,j,k}$ is computed. A plane (surfel) estimate $\pi = (n, o)$ is represented by the normal n, P nP=1, and the origin o. The TLS plane estimate is obtained by computing the singular value decomposition (SVD) of the matrix $C(\rho_s)$ and selecting $n = \theta_3$, the smallest singular vector of $C(\rho_s)$ and $o = c(\rho_s)$. The plane estimate is kept only if the singular values $\sigma_3^s \leq \sigma_2^s \leq \sigma_1^s$ satisfy the planarity constraints $\sigma_3^s/\sigma_2^s < \tau_p$, $\sigma_2^s/\sigma_1^s > \tau_{KK}$. $\rho_s = 3$ m, $\tau_p = 0.1$ and $\tau_{KK} = 0.05$ is used.

The surfel defined at the scale $\rho_{s_0}$ which yields the minimum normalized estimation error $\sigma_3^{s_0}$ is retained and assigned to voxel $Y(o, v_g)$. Note that due to noise it is possible to have $(i,j,k) \neq Y(o, v_g)$. If a voxel is assigned more than one surfel, the one with the smallest error $\sigma_3$ is retained. Surfels with normals orthogonal to the vertical direction are removed because aerial data has very few points sampled from vertical surfaces (e.g., walls, fences).

Let $\Gamma_1 \subset \Gamma$ be the subset of putative ground voxels containing surfels, and let $\Gamma_2 \subset \Gamma_1$ be the subset of $\Gamma_1$ that contains voxels having at least one point $\rho_u$ satisfying $\rho_u^s \leq B_{i,j} + h_0$, $h_0 < H_{max} + 6\sigma_v$. $h_0 = 4$ m is used. For each voxel $(i,j,k) \in \Gamma_1$ a histogram $H_{i,j,k}$ of normal coherence measures $|n_{i',j',k'}^T n_{i,j,k}|$ is computed for all voxels $(i',j',k') \in \Gamma_1$, P $q_{i',j',k'} - q_{i,j,k} P \leq R$, with R=10 m. The entropy of the histogram $H_{i,j,k}$ yields a planarity measure at a 3D location.

A set of seed voxels $\Gamma_3 \subset \Gamma_2$ is selected by sorting the voxels in $\Gamma_2$ in the increasing value of the entropy measures and utilize a greedy strategy to select voxels, followed by non maxima suppression to ensure spatial separation. Starting at each seed voxel from $\Gamma_3$ a 26-connected-component region growing is performed by recursively adding new voxels from $\Gamma_1$ that have consistent normals with their immediate neighbors. A voxel can be assigned to at most one ground region $\Gamma_{g_i}$. The resulting ground voxel set is $\Gamma_g = \{\Gamma_{g_i} | |\Gamma_{g_i}| > A_{min}/v_g^2\}$, with $|\Gamma_{g_i}|$ denoting the number of voxels in $\Gamma_{g_i}$. $A_{min} = 500$ m$^2$ is used based on experimentation. $\Gamma_g$ provides only a coarse ground estimate because: (i) the voxel size $v_g$ used may be larger than the noise $\sigma_v$; (ii) there may be ground points which belong to voxels without surfels (e.g., near buildings); (iii) some ground regions (courtyards), may have areas less than $A_{min}$.

A digital terrain model (DTM) is computed, which is represented as an image T containing at each pixel $T_{i,j}$ the sampled ground height. The size of the pixel, w, is chosen small enough to ensure that constant ground height is a valid approximation. The DTM is initialized using height values sampled from $\Gamma_g$ and apply kernel smoothing to smooth out the surfel estimates and to interpolate ground at missing locations.

Some entries in the matrix T may still be undefined, for example underneath buildings. To estimate the missing ground locations, the missing ground locations are grouped into holes based on eight-connected-component neighboring constraints. For each hole region the surrounding pixels are determined from T containing valid height estimates and use them to extrapolate the height within the hole.

A point $p_u$ is classified as nonground, $p_u \in N$, if $$*-0.19 cm p_u^z \geq T_{i,j} + h_b, (i,j) = Y([p_u^x, p_u^y]^T, w), \tag{1}$$

where $h_b$ is the minimum height of a building, specified by the user. In the present invention, $h_b = 2$ m.

Referring again to FIG. 3, building segmentation and clutter removal is described, which performs step 36 of FIG. 2. In the following steps, regions corresponding to coherent regions require further processing for fitting roofs of buildings. A planar model is assumed for each roof. At step 50, local surfels of the non-ground points previously determined are estimated at an adaptive scale. Since boundaries between buildings and ground are no longer sharp, it is necessary to iteratively pick a radius that is progressively larger from a small value. If a radius starts out small, too few points are captured; if a radius becomes too large, then a surfel may run between two adjacent buildings. Therefore, the local covariance at multiple scales at each voxel which contains 3D data is computed. At step 52, non-ground surfels are grouped into coarse regions using the bottom up region growing technique described earlier. A histogram of local normal orientation is determined and a measurement of local planarity is computed by integrating normal direction cues over a large area. Region growing is started from voxels which have a higher degree of local planarity. A voxel is joined into a proposed region if local planar regions are coherent (i.e., neighboring surfels whose normals are the same and whose origins are consistent such that it can be concluded that the neighboring surfels belong to the same plane). At step 54, planes are more robustly estimated for each course region. This is achieved by enforcing a constraint that joined surfels are either planar or quadric surfaces, so that such planar surfaces are fit to the course regions. A RANSAC scheme is employed to extract planar structures for each coherent region. At step 56, the fitted planes of step 54 are refined by employing expectation maximization. Expectation maximization is an iterative process by which an expectation is assumed such that certain points are assumed to belong to a plane and others are declared as outliers. Then an attempt is made to fit the points which are not outliers to planes. More points will be fit and fewer points will be declared as outliers. These points are assigned to planes or declared outliers until there is no more changes to the assigned points on planes or outliers, i.e., the algorithm converges (which is guaranteed). In the expectation step, it is assumed that there are $\Pi_k$ planar hypotheses. Each point $x_i$ from a region R is assigned to the plane $\Pi_{ki}$ which has a minimum $d(x_i, \Pi_{ki})$ is smallest and satisfies $d(x_i, \Pi_{ki}) < D_{max}$. In the maximization step, the planes $\Pi_k$ are refined from the 3D points which were assigned to them. After planar regions are estimated, planes are joined which have consistent origins and normals. At step 58, building regions are segmented so as to enforce neighborhood constraints between planes and ensure sharp boundaries between regions by employing a loopy belief propagation (BP) framework. Said another way, local consistency for each point belonging to a plane is enforced, i.e., regions which are disconnected within a global plane are segmented as individual planes. Voxels which are not grouped into any region are labeled as clutter (e.g., trees) and removed.

A specific rigorous implementation of step 56 for parametric surface refinement with expectation maximization is described hereinafter. To initialize the building segmentation, surfels are estimated at voxel locations containing non-ground points $p_u \in N$ using a similar adaptive estimation described above in the rigorous implementation of steps 4048. Building segmentation requires a smaller voxel size $v_b < v_g$ compared to ground classification. $v_b = 1$ m is used, since the data handled has typically a distance between samples of 1 m or more. Formally, let $\Phi$ denote the set of nonground voxels and $\Phi_1 \subset \Phi$ denote the subset of voxels from $\Phi$ which contains surfels. A bottom-up grouping of neighboring voxels that contain consistent surfels into larger, nonparametric regions $R_i$ is employed. Two voxels $(i_0, j_0, k_0)$, $(i_1, j_1, k_1) \in \Phi_1$ are considered consistent if $$\|q_{i_0,j_0,k_0} - q_{i_1,j_1,k_1}\| \leq \delta, |n_{i_0,j_0,k_0}^T n_{i_1,j_1,k_1}| \geq \kappa_1, \quad (2)$$

$$|n_{i_0,j_0,k_0}^T d_{0,1}| \geq \kappa_2, |n_{i_1,j_1,k_1}^T d_{0,1}| \leq \kappa_2, \quad (3)$$

with $$d_{0,1} \stackrel{def}{=} (o_{i_0,j_0,k_0} - o_{i_1,j_1,k_1})/\|o_{i_0,j_0,k_0} - o_{i_1,j_1,k_1}\|$$

and $\kappa_1$, $\kappa_2$ are two thresholds and $\delta$ is the maximum distance between the closest two 3D points that belong to the same surface. $\delta$ is chosen to be at least the sampling size. $\delta = 2$ m, $\kappa_1 = \cos(10°)$ and $\kappa_2 = \cos(85°)$.

The regions $R_i$ with areas larger than a threshold are classified as buildings. The measurements which are not assigned to any valid region $R_i$ are classified as clutter.

It is assumed that buildings have flat (planar) roofs. A second-order model (quadric) can be used in the same framework to model vaults. Let $R_i$, $i=1, \ldots, N$ be the coarse regions produced in the previous section. For clarity of presentation the region index i is dropped. In each region R planar models are fit robustly using MLESAC as described in P. Torr and A. Zisermann, "MLESAC: A new robust estimator with application to estimating image geometry," *CVIU*, 78:138-156, 2000. The number of planes within R is unknown and has to be also estimated. Let $\pi_j$, $j=1, \ldots, P$ denote the surfels from region R. A number B<P surfels are sampled without replacement from the set $\{\pi_j, j=1, \ldots, P\}$ and a set $\Delta = \{\pi^*_b, b=1, \ldots, B\}$ is obtained. Algorithm 1 below is applied to segment out a number of planar regions $\Pi = \{\Pi_1, \ldots, \Pi_F\}$. The set $\Pi$ is refined using the expectation-maximization algorithm from algorithm 2 below.

Algorithm 1: Planar Segmentation Algorithm Using MLESAC

1. Initialize the set $\Pi = \{\}$ and the current set of measurements $U = \{p_u | p_u \in R\}$. Let F=1.
2. Calculate the MLESAC cost $$L_b^* = \sum_{p_u \in U} d^2(p_u, \pi_b^*), \pi_b^* \in \Delta, \text{ where} \quad (4)$$

$$d^2(p_u, \pi_b^*) = \min(D_{max}^2, |n_b^{*T}(p_u - o_b^*)|^2)$$

and $D_{max}$ is the inlier distance. $D_{max} = 3\sigma_v$.

3. Select the hypothesis $$\Pi_F \stackrel{def}{=} \pi_{b_F}^* \in \Delta$$

yielding the smallest cost (4). Assign the points $p_u \in U$ to the plane $\Pi_F = (n_F, o_F)$ if $|n_F^T(p_u - o_F)| \leq D_{max}$. Remove the points assigned to plane $\Pi_F$ from U.

4. Refine the plane hypothesis $\Pi_F$ using the measurements $p_u$ assigned to it. Insert $\Pi_F$ to the set $\Pi$. Remove from the hypothesis list $\Delta$ all surfels which are consistent with $\Pi_F$. Two planes (surfels) $\pi_1 = (n_1, o_1)$ and $\pi_2 = (n_2, o_2)$ are considered consistent when $|n_i^T(o_1 - o_2)| \leq D_{max}$, $i=1,2$.

5. If the number of measurements in U, |U|, satisfies $|U| \leq 3$, or the number of hypotheses $|\Delta| = 0$, STOP. Otherwise, set F=F+1 and go to Step 2.

Algorithm 2: Top-down Region Refinement Using the EM Algorithm

1. Initialize $t=0$ and $\Pi_f^0 = \Pi_f$, $f=1, \ldots, F$.
2. Expectation: For all $p_u \in R$ compute the probability (weight) of assigning $p_u$ to $\Pi_f^t = (n_f^t, o_f^t)$ $$\xi(p_u, \Pi_f^t) = \left[1 - \left(\frac{(p_u - o_f^t)^T n_f^t}{D_{\max}}\right)^2\right]^2,$$

if $|(p_u - o_f^t)^T n_f^t| \leq D_{\max}$, and $\xi(p_u, \Pi_f^t) = 0$, otherwise. As in Algorithm 1, $D_{\max} = 3\sigma_v$.

3. Maximization: Reestimate the planes $\Pi_f^{t+1}$, using a close-form variant of the HEIV algorithm as described in B. Matei and P. Meer, "Estimation of nonlinear errors-in-variables models for computer vision applications," *PAMI*, 28:1537-1553, 1999 (hereinafter "Matei and Meer"), in which each constraint is weighted by $\xi(p_u, \Pi_f^t)$. If changes occur, set $t=t+1$ and go to Step 2.

4. Assign $p_u \in R$ to the plane $\Pi_{f_0}^t$ $$f_0 = \arg\min_{f=1,\ldots,F} |(p_u - o_f^t)^T n_f^t|, \quad (5)$$

if $\left|(p_u - o_{f_0}^t)^T n_{f_0}^t\right| \leq D_{\max}$.

5. Repeat: merge any two planes $\Pi_{f_1}^t, \Pi_{f_2}^t$ if $$(\beta_{f_1} - \beta_{f_2})^T C_{\Pi_{f_{1,2}}}^\dagger (\beta_{f_1} - \beta_{f_2}) \leq \chi_{5,0.95}^2,$$

where $$\beta_{f_i}^T = [n_{f_i}^T, o_{f_i}^T], \quad C_{\Pi_{f_i}} \in R^{6 \times 6},$$

is the rank five covariance matrix of the plane estimates $\Pi_{f_i}^t$, $i=1,2$, estimated as in Matei and Meer, $C^\dagger$ is the pseudo-inverse of $C$ and $\chi_{p,1-\alpha}^2$ is a quantile of a $\chi^2$ distribution with $p$ degrees of freedom and coverage $1-\alpha$. Reestimate the merged plane and update $F = F-1$.

A specific rigorous implementation of step 58 for segmenting building regions so as to enforce neighborhood constraints between planes and ensure sharp boundaries between regions by employing a loopy belief propagation (BP) framework is described hereinafter. All coarse regions are projected onto the ground plane XY and neighborhood relationships between them are extracted. For each region $R_i$, $i=1, \ldots, N$ all the regions $R_j$ are determined that are within a distance $D=5$ m from $R_i$. The neighborhood relationships between regions form a graph. It is assumed that the neighborhood relationships are transitive, i.e. if $R_i \leftrightarrow R_j$ and $R_j \leftrightarrow R_k$, then $R_i \leftrightarrow R_k$. Cliques of regions forming disjoint sets are extracted. Clique extraction from graphs is an NP-complete problem so a sub-optimal approach is used based on greedy assignment.

Denote by B, one of the cliques results. Because each clique is independent of each other, the segmentation task can be distributed to be processed in parallel. Let $x_m^B, x_M^B, y_m^B, y_M^B$ be the bounding box of the regions in B projected onto horizontal plane. B is assigned to all the points $p_u$ having the x and y components within the bounding box of B. Let $f_{p_u}$ be the label of $p_u$, with $f_{p_u} \neq 0$, if it is assigned to a plane region $$\Pi_{f_{p_u}}$$

assigned to a region from B and $f_{p_u} = 0$ otherwise.

A set $\Psi = \{\Psi_1, \ldots, \Psi_J\}$ is initialized and $\Psi_m = \{p_u \in B | \forall p_v \in \Psi_m, \|\cdot\| \leq \delta, f_{p_u} = f_{p_v}\}$, $m=1, \ldots, J$, using greedy recursive grouping. This initial partitioning provides an estimate on the number of labels (regions) within B. The choice of $\delta$ was discussed in eq. (2). A point $p_u \in B$ is assigned to at most one region $$\Psi_{m_{p_u}}.$$

Define $V \in R^{n_x \times n_y}$, $n_x = |(x_M^B - x_m^B)/v_b|$, $n_y = |(y_M^B - y_m^B)/v_b|$ and assign all $p_u \in B$ to V. To simplify notations a cell $V_{i,j}$ is represented using one index, $V_q$. Due to visibility constraints, all the points belonging to $V_q$ will share the same label with $V_q$.

At $V_q$, we associate the belief vector $\lambda_q \in R^J$ containing the probability that $V_q$ belongs to each of the J regions. The set of labels $\zeta_q = \{m_{p_u} | m_{p_u} = 1, \ldots, J\}$, $|\zeta_q| \leq J$ is calculated of all the points $p_u$, within a small neighborhood of $p_u$ having $m_{p_u} \neq 0$.

At a cell $V_q$ the data term $v_q \in R^J$ is computed as $$v_q(m) = \begin{cases} \exp\left(-\frac{d^2(p_u, \Pi_m)}{2\sigma_v^2}\right), & \text{if } d(p_u, \Pi_m) \leq 3\sigma_v, \\ \exp(-9/2), & \text{otherwise,} \end{cases}$$

$$d(p_u, \Pi_m) = \min_{p_u \in V_q} |(p_u - o_p^m)^T n_p^m|.$$

A Potts model is employed to model the interaction between 4-connected neighboring cells cells $V_q$ and $V_r$ $$\omega_{q,r}(m_q, m_r) = \begin{cases} P_{potts}, & \text{if } m_q \neq m_r \\ 1, & \text{otherwise,} \end{cases}$$

because it reduces the complexity of BP from quadratic to linear. $P_{potts} = 0.01$.

A max-product algorithm which maximizes the joint probability of label assignment over all cells is used as described in C. Bishop, "*Pattern Recognition and Machine Learning*," Springer, 2006. The message from $V_q$ to $V_r$ is calculated as $$\psi_{q \to r}^t(m) = \max(\mu_q(m), a \cdot P_{potts}), \quad (7)$$

with $$\mu_q = v_q \prod_{s \in N(q) \setminus r} \psi_{s \to q}^{t-1}, \quad a \stackrel{def}{=} \max_m \mu_q(m) \text{ and } N(q)$$

is the neighborhood of q. The belief at node $V_q$ is $$b_q = v_q \prod_{s \in N(q)} \psi_{s \to q}^T, \quad (8)$$

where T is the last iteration of (7). The final label assigned to $V_q$ is $m_q = \arg\max_{m=1,\ldots,J} b_q(m)$.

Figure 4:
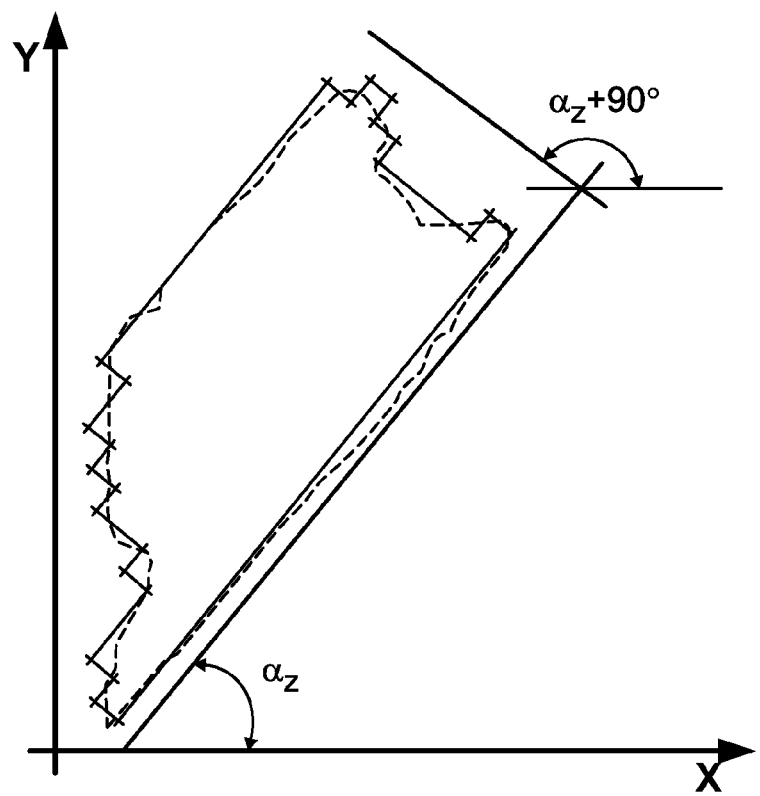
FIG. 4 is a diagram of an example of rectilinear fit for a 2D closed contour.
Figure 5A:
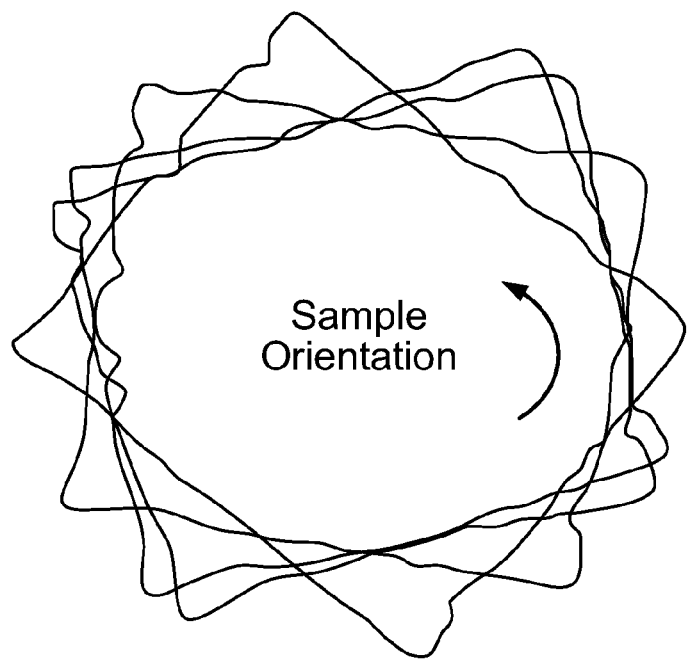
FIG. 5A is a diagram of a closed contour rotated at orientations sampled from 0° to 90°.
Figure 5B:
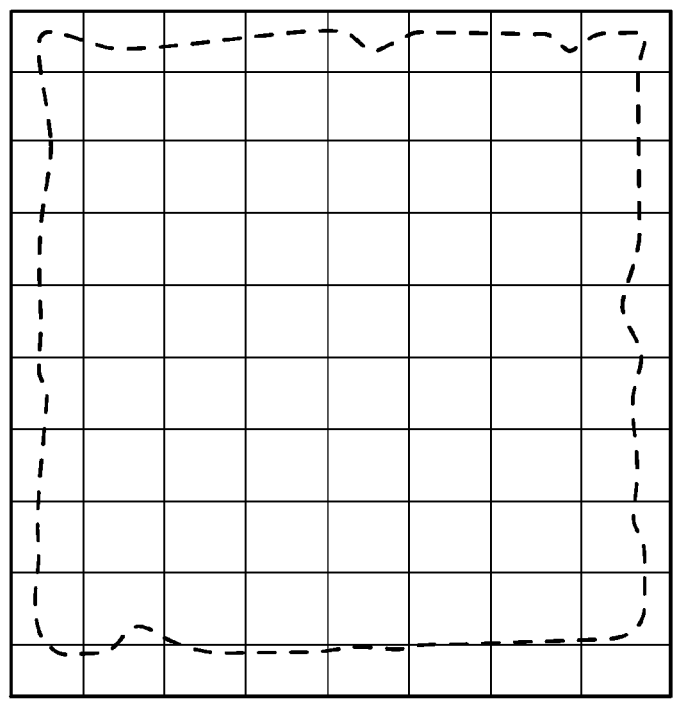
FIGS. 5B and 5C are diagrams illustrating a rectilinear fit of closed contours depending on a specific orientation.
Figure 5C:
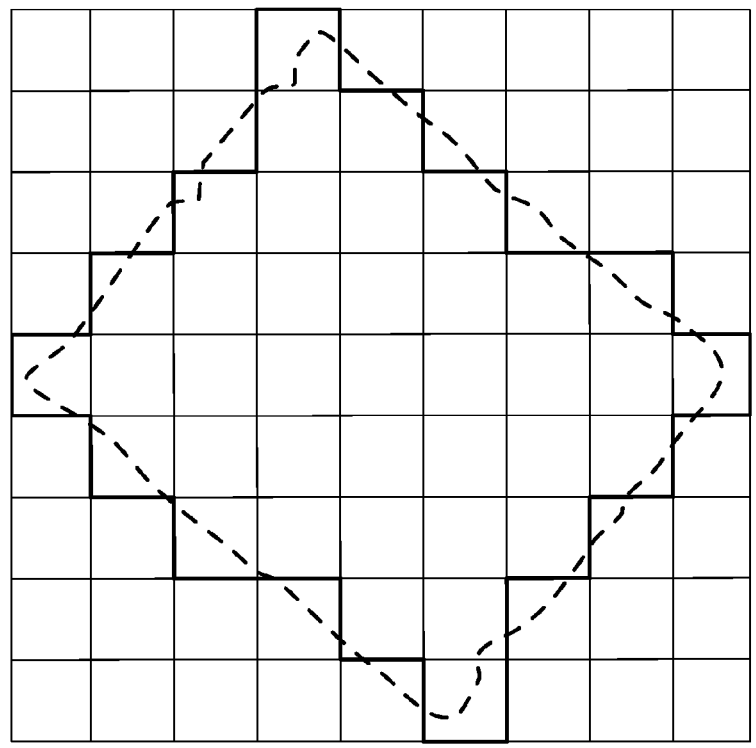

Referring again to FIG. 3, building orientation estimation is described, which performs step 38 of FIG. 2. At step 60, after obtaining a plurality of building segments in step 36 of FIG. 2, contours are extracted for each of the building segments previously found. For each 3D planar region corresponding to building segments, a contour is extracted using a ball pivoting algorithm as described in F. Bernardini, J. Mittleman, H. Rushmeier, C. Silva, and G. Taubin, "The ball-pivoting algorithm for surface reconstruction," EEE Transactions on Visualization and Computer Graphics, 5(4): 349-359, 1999. Once contours have been extracted, at step 62, the most likely orientation for each building is computed. Computing the orientation likelihood is based on the concept of fitting a rectilinear structure to a contour. The rectilinear structure follows the constraint that an angle between any two consecutive edges is a multiple of 90° as shown in FIG. 4. However, a random orientation for a sample rectilinear fit may result in a "jagged" fit having many 90° turns. Therefore, the sample fit is recalculated for a plurality of sampled orientation angles between 0° and 90° as shown in FIGS. 5A-5C. The best fit is the one yielding the smallest number of vertices in a rectilinear structure. It is evident from FIGS. 5B and 5C that the orientation with the least number of 90° turns is the one shown in FIG. 5B as compared to FIG. 5C. This criterion is similar to Minimum Description Length (MDL) which selects the fit which is the most compact.

Figure 6:
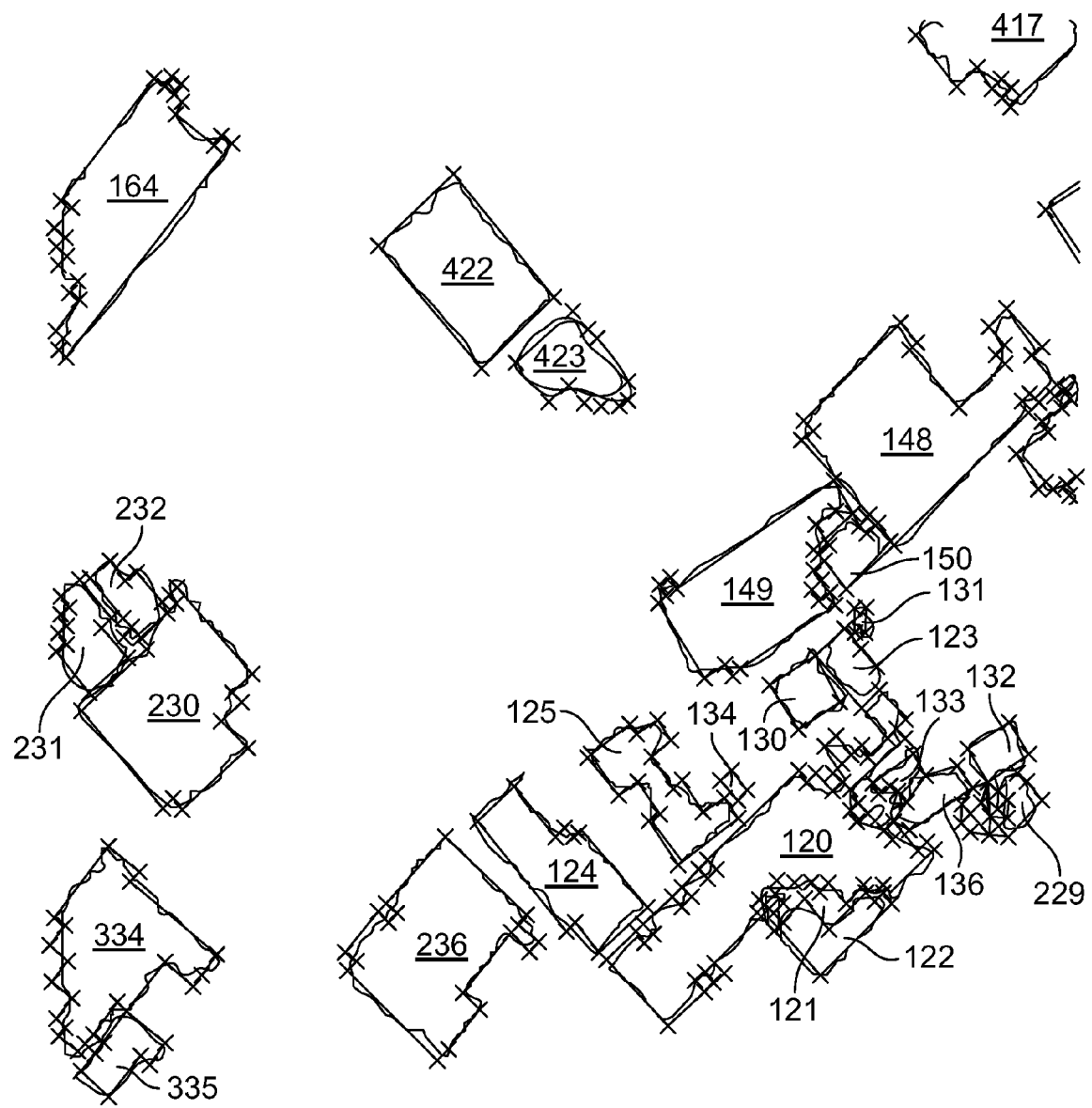
FIG. 6 is diagram showing a sample of rectilinear fits for several contours.
Figure 7A:
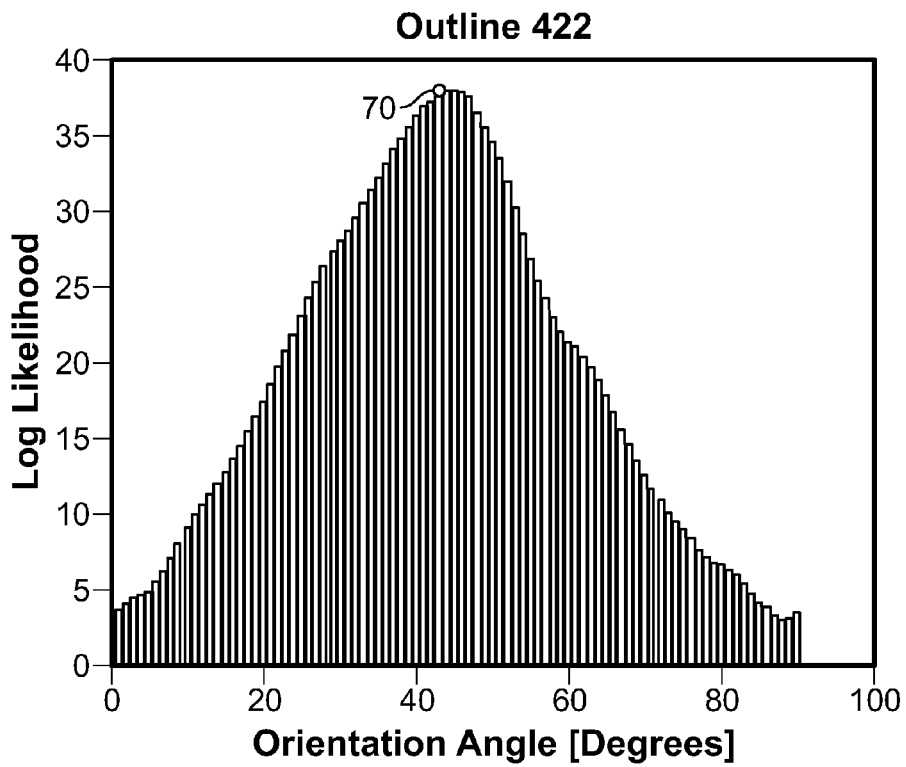
FIGS. 7A and 7B are plots of log likelihood of fit versus orientation angle for contour 422 and 434, respectively, of FIG. 6.
Figure 7B:
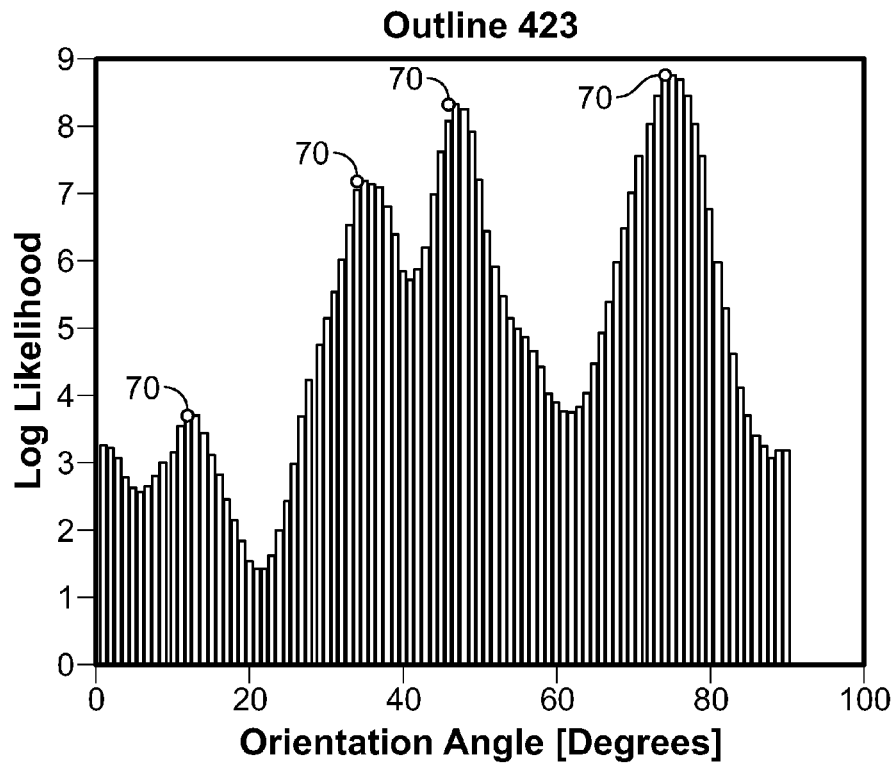

FIG. 6 shows a sample of rectilinear fits for several contours. FIGS. 7A and 7B are plots of log likelihood of fit versus orientation angle for contour 422 and 434, respectively, of FIG. 6. Note that the number of peaks denoted by circles 70 is much lower for contour 422 than for contour 423 resulting from a smaller outline and a more complex outline, respectively.

Figure 8:
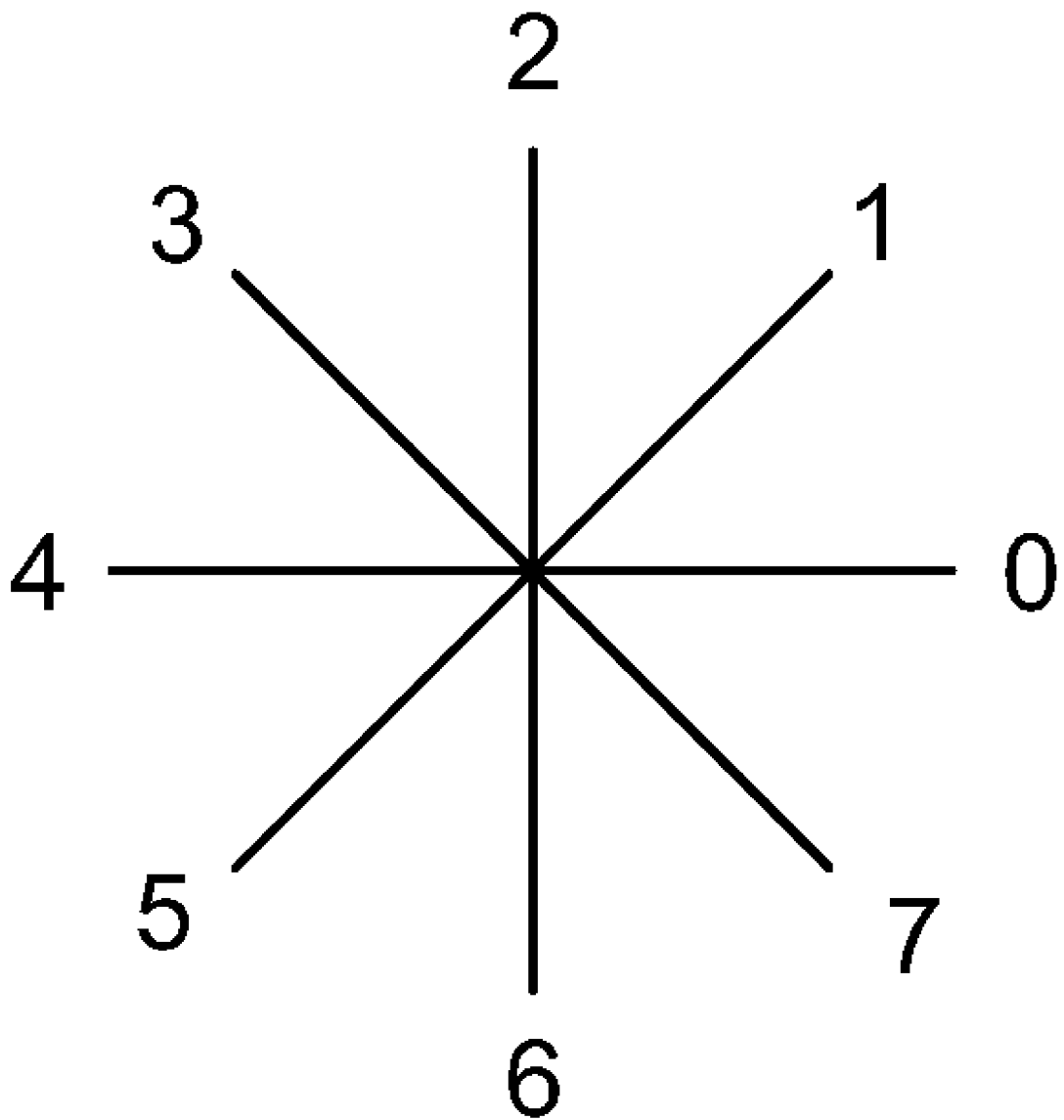
FIG. 8 is a diagram of a chain code utilized to represent the direction of an edge.

More particularly, referring again to FIGS. 5 and 6A-6C, the 2D orientation of any polygon can be uniquely specified by an angle between 0° and 180°. In the case of the rectilinear polygon, due to the constraint that the angles between any two sides are a multiple of 90°, the orientation of the rectilinear shape can be specified uniquely using $\alpha_z \in [0°; 90°]$. The points from the outline are assumed ordered in a counter-clockwise order and can be quantized in an image having length of the pixel $w_c$. $w_c$ is selected to be about 5 m based on the typical edge of a building. Based on the order of traversal of the contour points the pixel traversal order is determined. The upper-left occupied contour pixel is determined and then the contour is traversed, the pixels however at every step being moved only along the horizontal and vertical direction. To represent the direction of a side in the rectilinear polygon the chain code of FIG. 8 is employed. Let $(i_k, j_k)$ be the current pixel and $(i_{k+1}, j_{k+1})$ the next pixel on the contour. The direction $\gamma_{k+1}$ is found from the offset $(i_{k+1}-i_k, j_{k+1}-j_k)$. If $\gamma_{k+1}$ is an even number a corner is introduced if $\gamma_{k+1} \neq \gamma_k$. If $\gamma_{k+1}$ is an odd number an extra corner is introduced and the direction is approximated with two edges along the X and Y directions.

From FIG. 4 it can be seen that the number of vertices in the rectilinear outline approximation varies significantly with the change in orientation. For each angle $\alpha_k$ sampled uniformly from 0° to 90° a rectilinear polygon is fit and the number of vertices $\Lambda_{\alpha_k}$ is retained. The log-likelihood log $(L(\alpha_k))= \Lambda - \Lambda_{\alpha_k}$ is computed, where $\Lambda = \max_{\alpha_k} \Lambda_{\alpha_k}$, thus what is sought is the angle $\alpha_k$ which maximizes log $(L(\alpha_k))$.

In general, neighboring buildings have a consistent orientation. Therefore, at step 64, neighborhoods are established and orientation consistency for neighboring buildings is established. At step 66, a constraint is imposed that neighboring buildings of a local clique have a common orientation. More particularly, for each outline the modes of log-likelihood are extracted using mean-shift and only the modes which have a likelihood ratio higher than 0.8 compared to the best peak are retained. The neighboring outlines (regions) which have consistent orientation (i.e., they have peaks within 10° of each other) are determined. For all the neighboring outlines with consistent orientation the individual log-likelihoods are added and the angle corresponding to the maximum is determined. If $\alpha$ is the final angle estimate for a contour, the interval of the 2D projection of the contour along the direction corresponding to $\alpha$ and $\alpha+90°$ is computed and the angle leading to the largest interval is retained.

It is to be understood that the exemplary embodiments are merely illustrative of the invention and that many variations of the above-described embodiments may be devised by one skilled in the art without departing from the scope of the invention. It is therefore intended that all such variations be included within the scope of the following claims and their equivalents.

What is claimed is:

1. A method for automatically extracting a 3D terrain model for identifying at least buildings and terrain from light detection and ranging (LIDAR) data, comprising the steps of:
   generating a point cloud representing terrain and buildings mapped by LIDAR;
   classifying points in the point cloud, the point cloud having ground and non-ground points, the non-ground points representing buildings and clutter;
   segmenting the non-ground points into buildings and clutter;
   calculating a fit between at least one building segment and at least one rectilinear structure by rotating the at least one building segment incrementally, wherein the calculating is performed repeatedly until the fit yields the rectilinear structure with the fewest number of vertices.

2. The method of claim 1, wherein said step of calculating further comprises the steps of:
   (a) calculating a fit of a rectilinear structure to the at least one building segment, wherein each of the vertices has an angle that is a multiple of 90 degrees; and
   (b) counting the number of vertices.

3. The method of claim 1, further comprising the step of rendering the orientations of building segments to be consistent with neighboring buildings.

4. The method of claim 3, further comprising the steps of, before the step of calculating:
   extracting contours for each of the building segments.

5. The method of claim 4, wherein a contour is extracted using a ball pivoting algorithm.

6. The method of claim 1, wherein said step of segmenting the non-ground points into buildings and clutter further comprises the steps of:
   estimating local surfels of the non-ground points at an adaptive scale and forming the volumetric regions into voxels at the local surfels;
   grouping non-ground surfels into coarse regions using a bottom up region growing technique;
   estimating planes for each course region;
   refining the location of the planes by fitting points to the planes by employing an expectation maximization technique; and
   segmenting building regions from the planes so as to enforce neighborhood constraints between planes and ensure sharp boundaries between regions by employing a loopy belief propagation (BP) framework.

7. The method of claim 6, wherein the voxels that are not grouped into any of the planes are removed as clutter.

8. The methods of claim 6, wherein said step of estimating local surfels further comprises the step of computing the local covariance at multiple scales at each of the voxel which contains 3D data.

9. The method of claim 6, wherein said step of grouping non-ground surfels into coarse regions further comprises the steps of:
   determining a histogram of local normal orientation and computing a measurement of local planarity by integrating normal direction cues over a large area; and
   starting region growing from the voxels which have a higher degree of local planarity,
wherein a voxel from the voxels is joined into a proposed region if local planar regions are coherent.

10. The method of claim 6, wherein said step of estimating planes for each course region further comprises the step of enforcing a constraint that joined surfels are either planar or quadric surfaces, so that the planar surfaces are fit to the course regions.

11. The method of claim 6, wherein the expectation maximization technique includes iteratively fitting points to planes and declaring points not fitting on any planes as outliers until there is no more changes to the assigned points on planes or outliers.

12. The method of claim 1, wherein said step of classifying points in the point cloud further comprises the steps of:
   performing an initial filtering out of points in the point cloud wherein high points are removed, the remaining points being putative ground points, the high points being those points that are higher than a maximum predetermined threshold;
   estimating surfels for each of the putative ground points;
   grouping ground surfels into planar regions using bottom-up region growing;
   constructing a hole-free terrain; and
   classifying points as ground and non-ground, wherein non-ground points are those which are higher than a predetermined threshold above the terrain.

13. The method of claim 12, wherein bottom-up region growing comprises the step of finding those neighboring surfels whose normals are the same and whose origins are consistent such that it can be concluded that the neighboring surfels belong to the same plane, and repeating said step of finding wherein until sharp edges are reached.

14. A system for automatically extracting a 3D terrain model for identifying at least buildings and terrain from light detection and ranging (LIDAR) data, comprising:
   a processor being configured for:
   generating a point cloud representing terrain and buildings mapped by LIDAR;
   classifying points in the point cloud, the point cloud having ground and non-ground points, the non-ground points representing buildings and clutter;
   segmenting the non-ground points into buildings and clutter; and
   calculating a fit between at least one building segment and at least one rectilinear structure by rotating the at least one building segment incrementally, wherein the calculating is performed repeatedly until the fit yields the rectilinear structure with the fewest number of vertices.

15. The system of claim 14, wherein said step of fitting further comprises the steps of:
   (a) calculating a fit of a rectilinear structure to the at least one building segment, wherein each of the vertices has an angle that is a multiple of 90 degrees; and
   (b) counting the number of vertices.

16. The system of claim 14, further comprising the step of rendering the orientations of building segments to be consistent with neighboring buildings.

17. The system of claim 16, further comprising the steps of, before the step of calculating:
   extracting contours for each of the building segments.

18. The system of claim 14, wherein said step of segmenting the non-ground points into buildings and clutter further comprises the step of:
   estimating local surfels of the non-ground points at an adaptive scale and forming the volumetric regions into voxels at the local surfels;
   grouping non-ground surfels into coarse regions using a bottom up region growing technique;
   estimating planes for each course region;
   refining the location of the planes by fitting points to the planes by employing an expectation maximization technique; and
   segmenting building regions from the planes so as to enforce neighborhood constraints between planes and ensure sharp boundaries between regions by employing a loopy belief propagation (BP) framework.

19. The system of claim 14, wherein said step of classifying points in the point cloud further comprises the steps of:
   performing an initial filtering out of points in the point cloud wherein high points are removed, the remaining points being putative ground points, the high points being those points that are higher than a maximum predetermined threshold;
   estimating surfels for each of the putative ground points and forming the volumetric regions into voxels at the local surfels;
   grouping ground surfels into planar regions using bottom-up region growing;
   constructing a hole-free terrain; and
   classifying points as ground and non-ground, wherein non-ground points are those which are higher than a predetermined threshold above the terrain.

20. A non-transitory computer-readable medium carrying one or more sequences for automatically extracting a 3D terrain model for identifying at least buildings and terrain from light detection and ranging (LIDAR) data, wherein execution of the one of more sequences of instructions by one or more processors causes the one or more processors to perform the step of:
   generating a point cloud representing terrain and buildings mapped by LIDAR;
   classifying points in the point cloud, the point cloud having ground and non-ground points, the non-ground points representing buildings and clutter;
   segmenting the non-ground points into buildings and clutter; and
   calculating a fit between at least one building segment and at least one rectilinear structure by rotating the at least one building segment incrementally, wherein the calculating is performed repeatedly until the fit yields the rectilinear structure with the fewest number of vertices.

21. The computer readable medium of claim 20, wherein said step of fitting further comprises the steps of:
   (a) calculating a fit of a rectilinear structure to the at least one building segment, wherein each of the vertices has an angle that is a multiple of 90 degrees; and
   (b) counting the number of vertices.

22. The computer readable medium of claim 20, further comprising the step of rendering the orientations of building segments to be consistent with neighboring buildings.

23. The computer readable medium of claim 20, further comprising the steps of, before the step of calculating:
   extracting contours for each of the building segments.

24. The computer readable medium of claim 20, wherein said step of segmenting the non-ground points into buildings and clutter further comprises the step of:
   estimating local surfels of the non-ground points at an adaptive scale and forming the volumetric regions into voxels at the local surfels;
   grouping non-ground surfels into coarse regions using a bottom up region growing technique;
   estimating planes for each course region;
   refining the location of the planes by fitting points to the planes by employing an expectation maximization technique; and
   segmenting building regions from the planes so as to enforce neighborhood constraints between planes and ensure sharp boundaries between regions by employing a loopy belief propagation (BP) framework.

25. The computer readable medium of claim 20, wherein said step of classifying points in the point cloud further comprises the steps of:
   performing an initial filtering out of points in the point cloud wherein high points are removed, the remaining points being putative ground points, the high points being those points that are higher than a maximum predetermined threshold;
   estimating surfels for each of the putative ground points;
   grouping ground surfels into planar regions using bottom-up region growing;
   constructing a hole-free terrain; and
   classifying points as ground and non-ground, wherein non-ground points are those which are higher than a predetermined threshold above the terrain.

* * * * *

UNITED STATES PATENT AND TRADEMARK OFFICE
CERTIFICATE OF CORRECTION

PATENT NO. : 8,224,097 B2
APPLICATION NO. : 12/138027
DATED : July 17, 2012
INVENTOR(S) : Bogdan Calin Mihai Matei et al.

It is certified that error appears in the above-identified patent and that said Letters Patent is hereby corrected as shown below:

In Column 1, after the title, insert

--GOVERNMENT RIGHTS

This invention was made with U.S. government support under contract number DAAB07-03-D-B013. The government agency is Army TEC. The U.S. government has certain rights in this invention.--

Signed and Sealed this
Twenty-fifth Day of September, 2012

David J. Kappos
*Director of the United States Patent and Trademark Office*